United States Patent [19]

Ernest

[11] Patent Number: 4,585,752

[45] Date of Patent: Apr. 29, 1986

[54] CATALYST COMPOSITION FOR ULTRA HIGH TEMPERATURE OPERATION

[75] Inventor: Michael V. Ernest, Catonsville, Md.

[73] Assignee: W. R. Grace & Co., New York, N.Y.

[21] Appl. No.: 640,874

[22] Filed: Aug. 15, 1984

[51] Int. Cl.$^4$ .............................................. F23D 3/40
[52] U.S. Cl. ................................. 502/314; 502/308; 502/313; 502/327; 502/328; 502/332; 502/351; 502/354; 502/439
[58] Field of Search ............... 502/304, 308, 313, 327, 502/303, 355, 439, 332, 333, 334, 349, 351, 353, 354

[56] References Cited

U.S. PATENT DOCUMENTS

| | | | |
|---|---|---|---|
| 3,789,022 | 1/1974 | Schenker et al. | 502/304 |
| 3,846,979 | 11/1974 | Pfefferie | 60/39.04 |
| 3,928,961 | 12/1975 | Pfefferie | 60/39.23 |
| 3,940,923 | 3/1976 | Pfefferie | 60/39.23 |
| 3,945,946 | 3/1976 | Hindin et al. | 502/304 |
| 3,966,391 | 6/1976 | Hindin et al. | 502/527 |
| 4,021,185 | 5/1977 | Hindin et al. | 431/7 |
| 4,029,602 | 6/1977 | Risse | 502/527 |
| 4,088,435 | 5/1978 | Hindin et al. | 431/7 |
| 4,170,573 | 10/1979 | Ernest et al. | 502/303 |
| 4,220,559 | 9/1980 | Polinski | 502/353 |
| 4,237,032 | 12/1980 | Evans et al. | 502/384 |
| 4,283,308 | 8/1981 | Ohara et al. | 502/303 |
| 4,287,097 | 9/1981 | Fratzer et al. | 502/304 |
| 4,294,726 | 10/1981 | Bozon et al. | 502/304 |
| 4,303,552 | 12/1981 | Ernest et al. | 423/213.5 |
| 4,367,162 | 1/1983 | Fujitani et al. | 502/304 |
| 4,368,029 | 1/1983 | Lacroix | 431/7 |
| 4,426,320 | 1/1984 | Ernest | 502/349 |
| 4,438,219 | 3/1984 | Brandenburg et al. | 502/355 |

FOREIGN PATENT DOCUMENTS

EP72675  8/1982  European Pat. Off. ............... 431/2

Primary Examiner—John Doll
Assistant Examiner—Anthony McFarlane
Attorney, Agent, or Firm—Edward J. Cabic

[57] ABSTRACT

A high temperature stable catalyst is made with fine particles of a base metal such as chromium, hafnium and niobium or their oxides dispersed throughout a matrix made of composite particles having at least one platinum group metal on a ceria promoted, high temperature chemically stabilized refractory oxide powder. The refractory oxide powder can be either alumina, alumina powder which has been calcined at a temperature near incipient alpha alumina formation, silica-alumina or zirconia. The base metal or base metal oxide comprises about 15% to 90% by weight of the total weight and the platinum group metal comprises 0.05% to 10% by weight of the total weight. The catalyst composition can be applied as a washcoat to conventional substrates or it can be formed into shaped catalysts. The washcoat is made by mixing together one slip containing the composite particles with a second slip containing the base metal or base metal oxide particles.

27 Claims, No Drawings

CATALYST COMPOSITION FOR ULTRA HIGH TEMPERATURE OPERATION

BACKGROUND OF THE INVENTION

1. Field of the Invention

This invention relates to a catalyst composition and methods for making the catalyst which is capable of sustained high temperature operation.

2. Description of the Previously Published Art

Catalysts to carry out combustion of crude oil, hydrocarbon fuels, coal derived fuels, coal slurries as well as hydrogen are being made with the objectives of maximizing the heat output of the fuel as well as minimizing carbon monoxide, hydrocarbon and nitrogen oxide emissions. Reducing combustion temperatures to 1500° C. and below result in reduced nitrogen oxide emissions since the $N_2+O_2\rightarrow 2NO$ reaction is not favorable below that temperature. However, reducing the combustion temperatures by non-catalytic means still presents problems. If the amount of air is decreased to provide rich conditions, then there will be increased emissions of CO and hydrocarbons. If the amount of air is increased to provide lean conditions, then there will be increased $NO_x$ emissions as well as inefficient combustion as much of the heat generated during combustion is consumed in heating the diluent gases.

Catalytic combustion has the advantages of simultaneously reducing emission levels of all three components while efficiently combusting the fuel. It also has the advantage of permitting nearly complete combustion closer to the stoichiometric oxygen level. Because operation must be sustained at very high temperatures i.e., about 1200°–1300° C., for efficient operation, there is a need for ultra stable catalysts. Noble metals are effective catalytic components that have been used in first generation combustor systems. Many of the catalysts are auto exhaust type catalysts which are not designed for very high temperature operation. The Ernest et al U.S. Pat. No. 4,170,573 discloses a catalyst composition comprising a composite of ceria, lanthana, and alumina with a catalytically-effective amount of one or more platinum group metals. At higher temperatures, however, noble metals exhibit increased vapor pressure in air and can result in significant losses of noble metals. For that reason a totally noble metal type system is not seen as a viable candidate for sustained ultra high temperature operation.

Base metal oxides (such as $Cr_2O_3$) having low vapor pressure would be preferred. However, because of their dense, highly crystalline nature, they inherently do not bond well to ceramic substrates. Good bonding is a necessity due to the very high flow velocities encountered in combustor systems.

3. Objects of the Invention

It is an object of this invention to produce a catalytic composition which is capable of sustained operation at very high temperature and which will efficiently combust fuel with minimum oxygen present.

It is a further object of this invention to produce a catalytic composition which when used in catalytic combustion will result in low emission levels.

It is a further object of this invention to produce a washcoat composition which can be applied to a substrate to form an efficient combustion catalyst that operates at high temperatures.

It is a further object of this invention to provide a method of forming a washcoat composition which after application to a substrate will firmly bond to the substrate and operate efficiently.

These and further objects will become apparent as the description of the invention proceeds.

SUMMARY OF THE INVENTION

In this invention, these various prior art shortcomings have been overcome by forming a catalyst of a base metal or base metal oxide dispersed in a matrix of noble metal bearing bonding vehicle. The bonding vehicle consists of a refractory oxide such as zirconia, silica-alumina or alumina. A more preferred bonding vehicle is a stabilized alumina which has been stabilized with lanthana, a lanthana rich rare earth oxide or barium oxide. This bonding vehicle is itself catalyzed with noble metal, hence, providing not only bonding of the base metal oxide to the substrate, but also providing an active catalyst as well.

The catalyst material can be either applied as a washcoat to conventional catalyst substrates such as honeycomb monolith structures, particles or fibrous composites or the catalyst material may mixed into a paste and formed either into spheres or extruded into small individual particles or large, porous monolith bodies.

When making the catalyst to be applied as a washcoat, the washcoat is made by mixing together two slips. The first slip contains composite particles which have at least one platinum group metal on a ceria promoted, high temperature chemically stabilized refractory oxide powder. The second slip contains fine particles of a base metal or base metal oxide which is either chromium, hafnium or niobium or their oxides or mixtures thereof. The resulting mixed slip is applied as a washcoat to a support and the coated support is heated to remove volatile materials. The preferred refractory oxide powders are alumina, alumina powder which has been calcined at a temperature near incipient alpha alumina formation, silica-alumina or zirconia. The preferred high temperature stabilized refractory oxide is either lanthana stabilized alumina, a lanthana rich rare earth oxide stabilized alumina or a barium oxide stabilized alumina. In the catalyst composition the base metal or metal oxide comprises 15% to 90% by weight of the total solids content of the washcoat. The platinum group metal comprises 0.05% to 10% by weight of the total solids content of the washcoat. After the washcoat is applied, the catalyst may be further activated in a reducing atmosphere.

The catalyst composition of this invention has been found to be quite effective in catalyzing the combustion of crude oil and other hydrocarbon fuels which have been introduced to the catalytic combustor system as an atomized fuel-water emulsion. The crude oil or hydrocarbon fuel is catalytically combusted and the water is converted to superheated steam which is especially useful for down hole injection to remove heavy crudes.

DESCRIPTION OF THE PREFERRED EMBODIMENT

The catalysts made according to the present invention are suitable for use in high temperature combustor systems such as the type of boilerless steam generator described by J. A. Latty et al in European Pat. No. 72,675. In this system superheated steam is produced by burning a fuel in combination with the water. As seen in FIG. 4 of the Latty et al patent the monolith catalysts are arranged vertically in series with the fuel and water applied to the top of the series.

By making catalysts according to the present invention from a washcoat formed from the two slip components, these high temperature stable catalysts can be effectively employed in the combustor of a high temperature steam generator.

A preferred catalyst composition of the present invention comprises a mixture of ceria, lanthana, and a catalytically-effective amount of one or more platinum group metals deposited on the refractory oxide alumina to form a composite particle which is then in admixture with particles of a base metal or base metal oxide. The composite particle is prepared by depositing a cerium compound on a calcined admixture of the lanthana and the alumina and calcining the composite particle. Based upon the weight of the composite particle, the alumina, expressed as $Al_2O_3$, is present in an amount of from about 65 to about 98 weight percent; the lanthana, expressed as $La_2O_3$, is present in an amount of from about 1 to about 10 weight percent; and the ceria, expressed as $CeO_2$, is present in an amount of from about 1 to about 25 weight percent. The base metal or base metal oxide particles are admixed with the composite particles in an approximate ratio of from about 1:5 to 10:1 on a weight basis which corresponds to about 15% to 90% by weight of the total weight.

The catalyst is capable of operating in the combustion of carbonaceous fuel at high temperatures, e.g., greater than 2400° F. (1317° C.), for extended periods of time such as 20 hours with low emissions of carbon monoxide and nitrogen oxides.

A method of preparing a catalyst according to this invention is illustrated using alumina as the refractory oxide powder by (1) forming an admixture of an aluminum compound and a lanthanum compound; (2) calcining the admixture at a temperature of at least about 1800° F. (983° C.); (3) depositing a cerium compound on the calcined admixture to form a composite; (4) calcining the composite at a temperature of at least about 1200° F. (649° C.); (5) depositing one or more platinum group metal compounds on the calcined composite; and (6) calcining the resulting composition at a temperature from about 500° to about 1400° F. (260°–761° C.). The sequence of separate deposition and intermediate calcination employed with each metal compound in forming the composite provides effective stabilization of the alumina by the lanthana and of the platinum group metal by the ceria.

The base metal component is obtained commercially as fine metal powders. Alternatively, larger forms of the metal can be ground to produce the fine powder. The base metal oxide component is prepared by heating a salt form of the base metal such as chromic acetate to decompose it into the metal oxide form and then screening the powder to select the fine size. The powder is mixed with water to form a slip which is mixed with another slip made of the previously formed composite particles. The slips are mixed in appropriate ratios so that the ratio of the base metal (or metal oxide) to composite particles is from about 1:5 to 10:1 on a solids basis. The platinum group metal concentration is preferably about 4.5% of the total weight of the dried slip. To obtain this desired level, the amount of platinum group metal deposited on the composite particle will be varied depending on the ratio of the base metal particles to the composite particles used in forming the slip. For example, for a ratio of one part base metal or base metal oxide to three parts composite, then the preferred final 4.5% platinum group metal content can be obtained by loading the composite particles with 6% platinum group metal. The resulting slip can be applied to a support and activated to form the final catalyst.

When solutions of a lanthanum compound and a cerium compound are used to incorporate lanthana and ceria, then it is preferred to separately introduce each solution on the alumina to form a composite particle. The impregnation of each solution is followed by drying and calcination to deposit the metal oxide and the calcined composite particle is impregnated with a solution of one or more platinum group metal compounds.

Alumina forms the major portion of the preferred composite particles employed in the present invention. Alumina or aluminum compounds, that are thermally decomposed to alumina by the calcination performed in preparing the admixture of either lanthana or baria and alumina, may be used as the starting material in the preparation of the composite particle. The lanthanum compound or the barium compound can be incorporated along with alumina which may be in the transitional alumina precursor form or in the activated or transitional alumina form. Activated or transitional aluminas include chi, rho, kappa, gamma, delta, eta, and theta aluminas. Transitional aluminas are commercially available and are produced, for example, by heating alumina precursors such as aluminum halides, aluminum nitrate, alpha- or beta-alumina trihydrates, or alpha-alumina monohydrate. Generally, transitional aluminas are formed by a calcination of the precursor at a temperature of at least about 750° F. (399° C.) for at least about 1 hour, preferably at a temperature from about 750° to about 1400° F. (399°–761° C.) for about 1 to about 4 hours. The activated alumina generally has a surface area of at least about 100 square meters per gram, preferably at least about 150 square meters per gram, and a total pore volume of at least about 0.4 cubic centimeters per gram, preferably from about 0.45 to about 1.5 cubic centimeters per gram. The surface areas referred to throughout the specification are those determined by the nitrogen BET method or equivalent methods. The pore volumes are determined by adding water to a powder sample to the point where incipient wetness just occurs.

Optionally, the activated alumina can be chemically treated to enhance the stability of the final catalyst composition. Such treatment can include leaching the alumina by contacting it with an acid such as nitric acid, acetic acid, or hydrochloric acid for a sufficient time to increase its surface area and to remove adsorbed impurities such as sodium ions which reduce high temperature stability. The length of time required for leaching will be influenced by numerous factors, including the pore volume of the alumina being leached, the concentration of acid in the leaching solution, the temperature at which leaching is carried out, and the extent to which improved stability and catalyst performance is desired. Generally, in order to avoid loss of alumina by conversion to water-soluble salts and to provide enhanced stability, the alumina may be contacted at ambient temperatures of about 65° to about 80° F. (18°–27° C.) with an aqueous acidic solution having a pH of from about 3.0 to about 4.5 and maintained in contact with the solution for a period of at least about 2 hours, preferably from about 16 to about 72 hours. The alumina may be contacted with an amount of the aqueous acidic solution sufficient to provide between about 5 to about 50 parts by weight of acid per part by weight of alumina. The leached alumina is then separated from the acidic solution and washed with the acidic solution and then water. Completion of the washing can be conveniently determined by measuring the pH of the wash water after it has contacted the leached alumina. Ordinarily the washing is complete when the wash water pH is above 4.5 or slightly higher. The alumina is then dried at about 200° to about 350° F. (93°–177° C.). The dried alumina generally has a water pore volume of at least about 0.4 cubic centimeters per gram and a surface area of about 160 square meters per gram.

An admixture of alumina or other aluminum compound, and a lanthanum compound such as a lanthanum salt or a lanthanum rich rare earth compound (i.e. Ce-depleted rare earth mixture), or a barium compound is formed and calcined. For example, alumina may be impregnated with a solution of a thermally decomposable lanthanum compound and the impregnated alumina dried to remove the solvent and deposit the lanthanum compound on the alumina. Compounds of other rare earth metals, such as praseodymium and neodymium, and the mixture with lanthanum compounds may be used to form admixtures of one or more rare earth metal oxides and alumina on calcination. However, such admixtures generally are more susceptible to the phase transformation to alpha-alumina that occurs at high temperatures than lanthana-alumina admixtures.

The usual thermally decomposable lanthanum compound or barium compound is a commercially available water soluble salt, of which the nitrate and acetate are preferred. The salt is dissolved to form an aqueous solution which is incorporated with the alumina either in the transitional alumina precursor form or in the activated or transitional form.

The solution contains sufficient amounts of the lanthanum or barium compound to provide the desired amount of lanthana or barium oxide in the admixture. The amount of lanthana or barium oxide employed for stabilization depends upon the degree of stability desired. As lanthana or barium oxide are very efficient inhibitors of the transition to alpha-alumina, excessive concentrations of lanthana or barium oxide of the order of 10 weight percent may not be cost effective. If an excessive proportion of alumina is present, it may not be stabilized sufficiently and will lose surface area in the transition to the alpha form.

Generally, the admixture of alumina and lanthana or baria comprises about 75–99 weight percent alumina, expressed as $Al_2O_3$, and about 1–25 weight percent lanthana, expressed as $La_2O_3$ or baria (BaO). The preferred amount of stabilizing oxide is about 2 to about 10 weight percent to provide optimum stabilization against thermal damage and optimum catalyst performance.

The admixture may be dried at a temperature of from about 200° to about 400° F. (93°–205° C.) for about 2 to about 20 hours. The admixture is then calcined at a temperature of at least about 1800° F. (983° C.), preferably from about 1800° to about 2400° F. (983°–1317° C.) for about 1 to about 24 hours. Preferably, the calcination is conducted in air or other oxidizing atmosphere. The temperature and time of the calcination are such as to provide an alumina/stabilizing oxide admixture having a relatively high surface area of at least about 25 square meters per gram, and preferably at least about 40 square meters per gram.

Calcination results in formation of the metal oxides, if the oxide forms are not used as the starting materials, and stabilizes the alumina. The admixture is calcined before any further steps in the method are performed.

In order to enhance the oxidation performance of the catalyst composition, ceria or other cerium compound is deposited on the calcined admixture of the lanthana or baria and the alumina prior to the deposition of the platinum group metal component and the resulting composite is calcined. The ceria enhances the dispersion and stability of the platinum group metal in the catalyst composition. It is preferred to incorporate the cerium component in intimate association with finely divided lanthana-alumina or baria-alumina by impregnating the admixture with a solution of a cerium compound and calcining the resulting composite before it is coated on a substrate. An aqueous solution of cerium nitrate, chloride, acetate or any other suitable water-soluble salt that will decompose to the oxide on calcination may be employed. The stabilized-alumina may be impregnated to incipient wetness with a solution containing sufficient cerium salt to provide a ceria/lanthana or baria/alumina calcined composite that contains from about 1 to about 25 percent and preferably from about 3 to about 10 percent, by weight of cerium oxide expressed as $CeO_2$.

The composite may be dried at a temperature of from about 200° to about 400° C. (93°–205° C.) for about 2 to about 20 hours. The time and temperature of calcination are selected to avoid undue sintering and to provide a lanthana or baria/ceria/alumina composite having a surface area of at least about 25 square meters per gram. Suitable conditions include a calcination in air at a temperature of at least about 1200° F. (649° C.), preferably from about 1800° to about 2400° F. (983°–1317° C.) for about 1 to about 24 hours. The calcination before the deposition of the platinum group metal component prevents its occlusion by sintering.

The platinum group metal component may be platinum, palladium, rhodium, ruthenium, iridium, osmium, and mixtures thereof, with the preferred metals being Pt and Rh either alone or in any combination.

Various compounds, complexes, or fine metal dispersions of any of the platinum group metals in an aqueous or an organic medium may be used to achieve deposition of the platinum group metal component on the composite. A suitable liquid medium will not react with the platinum group metal component and is removable on drying which can be accomplished as part of the preparation or in use of the catalyst. Water soluble platinum group metal compounds or complexes may conveniently be used. Suitable platinum group metal compounds include chloroplatinic acid, potassium platinum chloride, ammonium platinum thiocyanate, platinum tetrammine hydroxide, platinum group metal chlorides, oxides, sulfides, nitrites and nitrates, platinum tetrammine chloride, palladium tetrammine chloride, sodium palladium chloride, hexammine rhodium chloride and hexammine iridium chloride.

In a preferred embodiment of this invention, the impregnation solution contains sulfito complexes of platinum group metals. For platinum either an acid or an ammonium sulfito complex can be used. The most preferred platinum source is the ammonium sulfito complex prepared according to the methods described in U.S. Pat. No. 3,932,309 (Graham et al). The use of these complexes provides excellent dispersion of the platinum group metal. Preferably, rhodium is incorporated in the catalyst by impregnation with either an acid or ammonium rhodium sulfito complex prepared by reacting rhodium trichloride or hydrous rhodium oxide with sulfurous acid or by impregnation with rhodium nitrate.

In a preferred embodiment of this invention the composite particles are held preferably for at least about one hour at room temperature after each impregnation is completed with the metal or metals. The composition may then be dried, for example, at a temperature of from about 100° C. to about 150° C. for about 2 to about 20 hours. The salt composition may be decomposed and the catalyst activated under conditions which provide a composition having characteristics that promote the desired reaction. The activation of the composite particles is done at a temperature which is at least high enough to decompose the platinum group metal bearing compounds. The compounds are decomposed to immobilize the metals before the composite particles are placed in the ball mill for mixing with the base metal particles. If the composite particles are air activated, then after the catalyst composition is finally produced the catalyst can be reduced. The temperature of this activation is low enough to permit neither noble metal sintering nor sintering of the support. The final activation of the formed catalyst is preferably done in a reducing atmosphere, e.g., by about a 1 hour reduction in flowing nitrogen containing 5 volume percent hydrogen at about 250°-550° C. and more preferably at about 400° C.

In the catalyst of this invention, the platinum group metals provide part of the catalytically active surfaces for oxidation, reduction and decomposition reactions and are present in amounts sufficient to provide catalytic compositions having significant activity for catalyzing these reactions. Generally, the amount of platinum group metal used is a minor portion of the catalyst composition and typically does not exceed about 10 weight percent of the calcined washcoat composition. The amount may be about 0.05 to 10 percent and is preferably about 0.1 to 6 percent based on the weight of the calcined catalyst composition to maintain good activity with prolonged use.

The base metal component can be either commercially obtained fine powders or ground metal. The base metal oxide component is prepared by heating a salt form of the base metal such as chromic acetate to decompose it or by precipitating a hydrous form and then calcining it. The preferred base metals are chromium, hafnium and niobium. They may be used in combination. The preferred salts are the chlorides, acetates and nitrates. The powder is then screened to select the fine size. The preferred powder size is less than about 10 microns. The powder is mixed with water to form a slip which is mixed with another slip made of the previously formed composite particles. The slips are mixed in appropriate ratios so that the ratio of the base metal (or metal oxide) to composite particles is from about 1:5 to 10:1 on a solids basis. The platinum group metal concentration is about 0.05 to about 10% and preferably about 4.5% of the total weight of the dried slip. To obtain this desired level, the amount of platinum group metal deposited on the composite particle will be varied depending on the ratio of the base metal particles to the composite particles used in forming the slip. The resulting slip is preferably ball milled to further reduce the particle size and to activate the surfaces to promote bonding. An acid may be added to peptize the solids. The ball milling can be done for any period of time up to 48 hours. The milled slip can be applied to a support and activated to form the final catalyst.

The catalyst composition of this invention is suitable for deposition on a substrate or for use without such deposition in either finely divided form or macrosize forms prepared by pelleting, extruding, and the like. Preferably, the catalyst compositions are deposited on a rigid substrate capable of maintaining its shape and strength at high temperatures, for example up to about 3200° F. (1761° C.). The substrate typically is relatively catalytically inert and has a low thermal coefficient of expansion, good thermal shock resistance, and low thermal conductivity. Preferably, the structure has considerable excessible porosity, such as a water pore volume of at least about 5%. The substrate may be metallic or ceramic in nature or a combination thereof. Preferred substrate materials include refractory metal oxides such as alpha-alumina, aluminosilicates, zircon, magnesium silicate, cordierite, cordierite/alpha-alumina, silicon nitrite, silicon carbide, zircon-mullite, spodumene, alumina-silica-magnesia, and zirconium silicate or refractory oxide composites such as mullite aluminum titanate. The preferred substrates for certain high temperature reactions are either monoliths or fibrous composites in the form of honeycombs and have a monolithic, skeletal structure having gas flow channels extending therethrough.

In preparing substrates coated with the catalyst compositions of this invention, an aqueous slurry or slip of the essentially water insoluble catalyst composition made of the composite particles and the base metal oxide particles is contacted with the substrate as by dipping the substrate into the slip. After drying, the solid content of the slurry forms an adherent deposit on the substrate. For example, using any suitable grinding means, such as acid ball milling, the composition is reduced to a particle size of about 1 to about 10 microns and homogenized with acid to form the slip. The coated substrate is then dried at a temperature of from about 200° to about 400° F. (95°-205° C.) for about 1 to about 4 hours to remove the solvent and deposit the solids in an adherent film on the substrate. The dried monolith may be calcined at from about 500° to about 1400° F. (260°-761° C.) for about 1 to about 4 hours.

The amount of the composition that is coated on the substrate depends on economics, size limitations, and design characteristics. Generally, the composition comprises about 1 to about 20 weight percent based upon the weight of the substrate.

Monolithic catalytic compositions prepared in accordance with this invention are particularly useful when employed in the high temperature combustion of carbonaceous fuels. Flammable mixtures of most fuels are normally constituted to burn with relatively high flame temperatures, i.e., about 3300° F. (1817° C.) and above, at which substantial amounts of nitrogen oxides are formed. However, there is little or no formation of nitrogen oxides from nitrogen in the air in a system which burns the fuel catalytically at lower temperatures. There may be some nitrogen oxides formed when the nitrogen compounds in the fuel are oxidized.

The catalyst composition of this invention may be used for the combustion of carbonaceous fuel by contacting a fuel/air admixture with the composition on the monolithic substrate at a temperature sufficient to combust the admixture. The proportions of fuel and air in the admixture charged to the combustion zone are typically such that there is a stoichiometric excess of oxygen based on the complete conversion of the fuel to carbon dioxide and water.

Suitable gaseous or liquid fuels include, for example, low molecular weight aliphatic hydrocarbons, aromatic hydrocarbons, middle distillate fuels, hydrotreated heavier fuels, alcohols, ethers, aromatic ethers, coal slurries, carbon monoxides, and hydrogen.

The fuel-air mixture is generally passed to the catalyst in the combustion zone at a linear gas velocity of above about 3 feet per second, but considerably higher velocities may be required depending upon such factors as temperature, pressure and fuel composition.

The catalyst composition generally operates at temperatures from about 1700° to about 3200° F. (927°–1761° C.) preferably about 2000° to about 3000° F. (1094°–1650° C.). The temperature of the catalyst zone may be controlled by controlling the fuel-air ratio. The total residence time in the combustion system should be sufficient to provide essentially complete combustion of the fuel.

The catalyst of this invention can also be used to promote the oxidation of hydrocarbons, oxygen-containing organic compounds such as aldehydes and organic acids, carbon monoxide and other products of incomplete combustion. The catalysts of the present invention are especially useful in the conversion of carbon monoxide and partially combusted hydrocarbons that are present in the exhaust gases from the combustion of carbonaceous fuels. Under reducing conditions, which are deficient in oxygen, the catalyst can reduce $NO_x$ levels where rhodium is present or palladium is present.

Having described the basic aspects of our invention, the following examples are given to illustrate specific embodiments thereof.

EXAMPLE 1

This example illustrates the preparation of an active lanthana alumina powder.

A lanthanum nitrate solution was prepared by dissolving 5433 grams of lanthanum nitrate crystals (37.6% $La_2O_3$) in 56.77 liters of water and adding 102.96 kilograms of an alumina filter cake having a solids content of 31% made by the procedure described in U.S. Pat. No. 4,371,513 to Sanchez et al. The resulting slurry was then spray dried using a vane wheel revolving at 18,000 rpm with an inlet temperature of 800° F. (427° C.) and an outlet temperature of 300° F. (149° C.). The spray dried powder has a TV of 8.24% and a total rare earth oxide content of 6.06%.

This resulting lanthana containing powder was calcined for one hour at 2300° 1 F. (1260° C.) to produce a powder having a water pore volume of 0.905 cc/g, a BET ($N_2$) surface area of 44 $m^2/g$, and an alpha-alumina content of 4.5%.

EXAMPLE 2

This example illustrates the preparation of a ceria activated lanthana alumina powder.

The lanthana alumina powder of Example 1 in an amount of 2825 grams was impregnated to full incipient wetness (2555 ml.) with a solution prepared by diluting 355.2 grams of a cerous nitrate solution (24.6% $CeO_2$) with deionized water. The nominal $CeO_2$ level was 3%. This was dried at 275° F. (135° C.) and subsequently activated for one hour at 2200° F. (1204° C.). The resulting activated powder had a water pore volume of 0.95 cc/g, a TV of 0.34%, an alpha-alumina content of 4.9% and a BET ($N_2$) surface area of 37 $m^2/g$.

EXAMPLE 3

This example illustrates the preparation of washcoat powder containing 6% platinum/rhodium (weight ratio of 19/1) to be identified as Powder A.

The lanthana-ceria alumina powder of Example 2 in an amount of 600 grams (dry basis) was impregnated to full incipient wetness (572 ml.) with a solution prepared by mixing 379.07 grams of $(NH_4)_6Pt(SO_3)_4$ solution (9.598% Pt), 43.77 grams of $Rh(NO_3)_3$ solution (4.375% Rh), 6 grams of dibasic ammonium citrate and then diluting with deionized water. The impregnated powder was allowed to stand in a sealed polyethylene bag for one hour prior to drying at 275° F. (135° C.). The dried powder was activated in air at 1000° F. (538° C.) for one hour and it will be referred to hereafter as Powder A.

EXAMPLE 4

This example illustrates the preparation of a washcoat powder containing 4% platinum/rhodium (weight ratio of 19/1) to be identified as Powder B.

The lanthana-ceria alumina powder of Example 2 in an amount of 200 grams was impregnated to full incipient wetness (191 ml.) with a solution prepared by mixing 82.48 grams of $(NH_4)_6Pt(SO_3)_4$ solution (9.598% Pt), 9.524 grams of $Rh(NO_3)_3$ solution (4.375% Rh), 2 grams of dibasic ammonium citrate and then diluting with deionized water. The impregnated powder was allowed to stand in a sealed polyethylene bag for one hour prior to drying at 275° F. (135° C.). The dried powder was activated in air at 1000° F. (538° C.) for one hour and it will be referred to hereafter as Powder B.

EXAMPLE 5

This example illustrates the preparation of the $Cr_2O_3$ component of the catalyst composition of this invention to be identified as Powder C.

Chromic acetate in an amount of 1000 grams was decomposed by heating to 1200° F. (649° C.) in air and then screening to a particle size of less than or equal to 250 microns followed by activation at 2000° F. (1093° C.) for one hour. This $Cr_2O_3$ powder has a BET ($N_2$) surface area of 5 $m^2/g$ and will be referred to hereafter as Powder C.

EXAMPLE 6

This example illustrates the preparation of a monolithic combustion catalyst utilizing washcoat Powders A and C.

Powder A as prepared in Example 3 in an amount of 120 grams was ball milled with 255 grams of deionized water for 18 hours. The resulting slip had a pH of 4.54. A second slip was made with 32 grams of Powder C as prepared in Example 5 which was ball milled with 106 grams of deionized water for 18 hours. The resulting slip had a pH of 6.5. The two slips were mixed in a 3 to 1 ratio (on a solids basis) such that the resulting noble metal concentration of the dried slip when applied to a monolith would be 4.5%. The mixed slip had a pH of 4.59 and a viscosity of 700 centipoise at a solids content of 3.18%. Mullite aluminum titanate (MAT) monoliths of 3.17" diameter and ½" thickness (obtained from Corning Glass) having nominally 16 cells per square inch were double coated with drying at 350° F. (177° C.) between coats. The coated units were finally activated in a flow of 5% hydrogen balance nitrogen at 725°–750°

F. (385°–399° C.) for 2 hours. The washcoat thickness was calculated to be 53 microns.

EXAMPLE 7

This example illustrates the preparation of a monolithic combustion catalyst utilizing washcoat Powders B and C.

Powder B as prepared in Example 4 in an amount of 75 grams was ball milled with 159 grams of deionized water for 18 hours. A second slip was made with 30 grams of Powder C as prepared in Example 5 which was ball milled with 64 grams of deionized water for 18 hours. The resulting second slip had a pH of 6.57. The two slips were mixed in a 3 to 1 ratio (on a solids basis) such that the resulting noble metal concentration of the dried slip when applied to a monolith would be 3%. The mixed slip had a pH of 4.45 at a solids content of 30.6%. Mullite alumina titanate (MAT) monoliths of 3.17" diameter and ½" thickness (obtained from Corning Glass) having nominally 64 cells per square inch were double coated with drying at 350° F. (177° C.) between coats. The coated units were finally activated in a flow of 5% hydrogen balance nitrogen at 725°–750° F. (385°–399° C.) for 2 hours. The washcoat thickness was calculated to be 49 microns.

EXAMPLE 8

A test unit was employed having 10 monolith catalyst sections each having a diameter of 8.05 cm and a thickness of 1.27 cm. The first four monolith sections had 16 cells per square inch and the remaining 6 sections downstream had 64 cells per square inch. The monolith sections were arranged in pairs with reaction space provided between each pair. The 16 cell monolith catalysts were prepared according to Example 6 and the 64 cell monolith catalyst was prepared according to Example 7. The first four and last two monolith sections had been previously run in the device for about 8½ hours. The fifth through eighth units had been used for about 23½ hours.

During the period of the test the air fuel ratio was varied around the stoichiometric point and especially into the slightly lean region. After the system reached a steady-state temperature the temperature in the reaction zone following the first four monoliths was about 2400° F. (1316° C.) and in the reaction zone before the last two monoliths it was about 2050° F. (1121° C.). Thus the catalysts were experiencing temperatures of at least 2000° F. (1093° C.) throughout the test. The air flow rate was approximately 150 SCFM, the fuel emulsion was supplied at 0.36–0.38 gallon/minute and the system pressure was approximately 500 psi. The results are set forth in Table 1.

TABLE 1

| Time Stream Hr:min | CO ppm | $O_2$ % | UHC[1] ppm | $NO_x$ ppm | Equivalence Ratio[2] |
|---|---|---|---|---|---|
| 1:23 | 60 | 0.1 | 6 | 90 | 1.057 |
| 2:45 | 0 | 2 | 0.5 | 118 | 0.99 |

[1]UHC is unburned hydrocarbons
[2]Equivalence ratio relates to the amount of air used compared to the theoretical, stoichiometric amount which is 1.0. For values greater than 1.0, the mixture is rich and for values less than 1.0, the mixture is lean. The target is to operate at 1.0.

The results show that after 2 hours and 45 minutes on stream the catalysts were still effective since the final CO was a low 0 ppm, the UHC was only 0.5 ppm and the $NO_x$ was 118 ppm. This amount of $NO_x$ cannot be totally eliminated since there is always some nitrogen present as nitrogen compounds in the fuel.

The catalysts used in this system are also advantageous since they are capable of being lit off after repeated usage.

It is understood that the foregoing detailed description is given merely by way of illustration and that many variations may be made therein without departing from the spirit of this invention.

What is claimed is:

1. A high temperature stable catalyst comprising a mixture of:
    (a) fine particles of a base metal or base metal oxide selected from the group consisting of chromium, hafnium, niobium, chromium oxide, hafnium oxide, niobium oxide and mixtures thereof; and
    (b) composite particles of a ceria promoted, high temperature chemically stabilized refractory oxide powder having at least one platinum group metal thereon, said composite particles serving as a bonding vehicle for said base metal or base metal oxide particles whereby said base metal or base metal oxide particles are dispersed throughout the mixture and whereby said base metal or base metal oxide exists in a fine particulate form.

2. A catalyst according to claim 1, wherein the refractory oxide powder is alumina, alumina powder which has been calcined at a temperature near incipient alpha alumina formation, silica-alumina or zirconia.

3. A catalyst according to claim 1, wherein the high temperature stable refractory oxide powder is a lanthana stabilized alumina, a lanthana rich rare earth oxide stabilized alumina or a barium oxide stabilized alumina.

4. A catalyst according to claim 1, wherein the base metal or base metal oxide comprise about 15% to 90% by weight of the total weight.

5. A catalyst according to claim 1, wherein the platinum group metal comprises 0.05% to 10% by weight of the total weight.

6. A catalyst according to claim 1, further comprising a substrate on which said catalyst composition is coated.

7. A catalyst according to claim 6, wherein the substrate is a honeycomb.

8. A catalyst according to claim 6, wherein the substrate is in particulate form.

9. A catalyst according to claim 6, wherein the substrate is a fibrous composite.

10. A catalyst according to claim 1, wherein said particles of a base metal or base metal oxide have a particle size of less than 10 microns.

11. A method of making a high temperature stable catalyst comprising:
    forming a catalyst washcoat by mixing together
    (a) a first slip containing composite particles comprising at least one platinum group metal on a ceria promoted, high temperature chemically stabilized refractory oxide powder, and
    (b) a second slip containing fine particles of a base metal or base metal oxide selected from the group consisting of chromium, hafnium, niobium, chromium oxide, hafnium oxide, niobium oxide and mixtures thereof;
    applying the washcoat to a rigid catalyst support substrate capable of maintaining its shape and strength at high temperatures; and heating the coated support to remove volatile materials wherein said composite particles serve as a bonding vehicle for said base metal or base metal oxide particles and wherein said base metal or base metal oxide exists in a fine particulate form.

12. A method according to claim 11, wherein the refractory oxide powder is alumina, alumina powder which has been calcined at a temperature near incipient alpha alumina formation, silica-alumina or zirconia.

13. A method according to claim 11, wherein the high temperature stable refractory oxide is a lanthana stabilized alumina, a lanthana rich rare earth oxide stabilized alumina or a barium oxide stabilized alumina.

14. A method according to claim 11, wherein the base metal or metal oxide comprises about 15% to 90% by weight of the total solids content of the washcoat and the platinum group metal comprises 0.05% to 10% by weight of the total solids content of the washcoat.

15. A method according to claim 11, further comprising activating the catalyst in a reducing atmosphere.

16. A high temperature stable catalyst made by the process of claim 11.

17. A high temperature stable catalyst made by the process of claim 12.

18. A high temperature stable catalyst made by the process of claim 13.

19. A high temperature stable catalyst made by the process of claim 14.

20. A high temperature stable catalyst made by the process of claim 15.

21. A method of making a high temperature stable catalyst comprising:
forming a paste mixture by mixing together
(a) composite particles comprising at least one platinum group metal on a ceria promoted, high temperature chemically stabilized refractory oxide powder;
(b) fine particles of a base metal or base metal oxide selected from the group consisting of chromium, hafnium, niobium, chromium oxide, hafnium oxide, niobium oxide and mixtures thereof; and
(c) water;
forming the paste into a catalyst shape; and
calcining the shaped catalyst whereby said composite particles serve as a bonding vehicle for said base metal or base metal oxide particles and said base metal or base metal oxide particles are dispersed throughout the mixture and whereby said base metal or base metal oxide exists in a fine particulate form.

22. A method according to claim 21, wherein the paste is extruded to form either small individual extrudate particles or large, porous monolith bodies.

23. A method according to claim 21, wherein the paste is formed into spherical particles.

24. A washcoat composition for application to a support to produce a high temperature stable catalyst comprising a slip mixture of
(a) composite particles comprising at least one platinum group metal on a ceria promoted, high temperature chemically stabilized refractory oxide powder, and
(b) fine particles of a base metal or base metal oxide selected from the group consisting of chromium, hafnium, niobium, chromium oxide, hafnium oxide, niobium oxide, and mixtures thereof,
said composite particles being capable upon heating of serving as a bonding vehicle for said base metal or base metal oxide particles whereby said base metal or base metal oxide particles are dispersed throughout the mixture and whereby said base metal or base metal oxide exists in a fine particulate form.

25. A washcoat composition according to claim 24, wherein the refractory oxide powder is alumina, alumina powder which has been calcined at a temperature near incipient alpha alumina formation, silica-alumina or zirconia.

26. A washcoat composition according to claim 24, wherein the high temperature stable refractory oxide powder is a lanthana stabilized alumina, a lanthana rich rare earth oxide stabilized alumina or a barium oxide stabilized alumina.

27. A washcoat composition according to claim 24, wherein the base metal or metal oxide comprise about 15% to 90% by weight of the total solids content of the washcoat and the platinum group metal comprises 0.05% to 10% by weight of the total solids content of the washcoat.

* * * * *